United States Patent [19]

Noble

[11] Patent Number: 5,008,697
[45] Date of Patent: Apr. 16, 1991

[54] IMAGE RECORDING SYSTEM AND METHOD

[75] Inventor: Stephen A. Noble, Rochester, N.Y.

[73] Assignee: Eastman Kodak Company, Rochester, N.Y.

[21] Appl. No.: 531,215

[22] Filed: May 31, 1990

[51] Int. Cl.⁵ .................. G03B 7/00; G03B 15/05; H04N 5/225; H04N 3/14
[52] U.S. Cl. ........................ 354/413; 354/71; 354/145.1; 358/909; 358/213.19
[58] Field of Search ............... 354/76, 145.1, 412, 354/413; 358/906, 909, 213.19

[56] References Cited

U.S. PATENT DOCUMENTS

| | | | |
|---|---|---|---|
| 4,788,565 | 11/1988 | Masuda et al. | 354/75 |
| 4,805,037 | 2/1989 | Noble et al. | 358/335 |
| 4,831,450 | 5/1989 | Sato et al. | 358/209 |
| 4,841,359 | 6/1989 | Hawkins et al. | 358/76 |
| 4,862,280 | 8/1989 | Iida et al. | 358/229 |

Primary Examiner—W. B. Perkey
Assistant Examiner—Jae N. Noh
Attorney, Agent, or Firm—Francis H. Boos, Jr.

[57] ABSTRACT

A system for simultaneous recording of a flash image on photographic film and video cameras in which flash operation during the process of image transfer out of an image sensor in the video camera is avoided by means of a simple synchronizing circuit. The synchronizing circuit operates in response to a flash request signal from the film camera to interrupt the transfer of image information out of the image sensor in the video camera for at least the duration of the flash illumination on the subject. Following conclusion of the flash illumination, the synchronizing circuit resets the image sensor processing circuits to restart transfer of the image information out of the image sensor at the beginning of an image field. The restart can coincide with conclusion of the flash illumination or can be delayed to coincide with a desired video frame in the composite video signal.

10 Claims, 2 Drawing Sheets

IMAGE RECORDING SYSTEM AND METHOD

FIELD OF INVENTION

This invention relates to image recording, and more particularly to a system and method for simultaneously capturing substantially identical images of a subject on a video camera and a photographic film camera operating in synchronism with a single flash illumination.

BACKGROUND OF INVENTION

It is well known to be desirable to simultaneously record substantially identical photographic film and electronic video images of a subject. This is particularly useful in portrait photography, although other photographic situations may equally benefit from this capability. The recorded video images can be used, for example, as electronic "proofs" of the picture composition before the expense of developing and printing of the photographic negatives is incurred.

The use of flash illumination is required for most indoor and some outdoor photographic opportunities. During such flash exposure, the film camera lens remains open for a predetermined period of time, while the flash illumination is provided during a window of time within this predetermined period. Because the flash illumination substantially entirely defines the exposure onto the photographic film, and because the flash illumination time is short, the operation of the film and video cameras must be carefully synchronized to obtain substantially identical images.

U.S. Pat. No. 4,805,037, Noble et al, describes one form of synchronization system in which the synchronization is such that when the film camera captures a photographic image of the subject, the video camera captures substantially the same view of the subject as an image frame comprised of two consecutive interlaced video fields, the flash illumination being substantially entirely and equally distributed between the two fields of video information. The capturing of the video image is accomplished by inhibiting, during the flash illumination, any transfer of information from the image sensor in the video camera. Upon termination of the flash illumination, the next two video fields are transferred to provide a full video frame of the subject of interest. Although satisfactory for its intended purpose, this arrangement requires substantial modification of a conventional video camera and related synchronization circuits to provide means to inhibit the image transfer process and thus adds undesirable complexity and cost to the system.

It is therefore an object of the present invention, to provide a method and system for recording images of a subject in electronic and photosensitive mediums in which the film and video cameras are synchronized to capture substantially identical film and full frame video images with a single flash illumination.

It is another object of the present invention to provide a method and system of image recording system allowing simultaneous capture of flash illuminated film and video images of a subject that is simple and inexpensive to implement.

It is yet another object of the invention to provide a method and system of the type described wherein the flash illumination can be initiated in a random manner with respect to the operation of the video components of the system while maintaining full and even flash illumination distribution across a complete video frame (either interlace or non-interlace type) following completion of the flash illumination.

SUMMARY OF INVENTION

Thus, in accordance with the invention, an image recording system for simultaneously recording images of a subject in electronic and photosensitive media comprises a photographic camera for recording a photographic image of the subject on the photosensitive medium, the photographic camera including means for supplying a flash request signal and a video camera including a solid state image sensor for capturing an image of the subject on the image sensor, the video camera including video signal processing circuits for converting image information from the image sensor into a video signal and a timing generator including image transfer clocking means for controlling transfer of the image information from the image sensor to the video processing circuits. The system of the invention further includes flash means responsive to the flash request signal for flash illuminating the subject to allow simultaneous image capture by the photographic and video cameras and includes reset means responsive to the flash request signal for interrupting operation of the clocking means at the beginning of a flash illumination and for restarting the clocking means following conclusion of the flash illumination to initiate, at the beginning of an image field, the transfer of image information from the imaging device to the video signal processing circuits.

In one preferred embodiment of the invention, the timing generator includes means for supplying video timing signals to the video processing circuits and the reset means is adapted to interrupt and restart the video timing signals simultaneous with the image transfer clocking means to maintain synchronism between the two. In another preferred embodiment of the invention, the reset means includes means responsive to a field timing signal to synchronize restarting of the image transfer clocking means with the beginning of a desired field interval following conclusion of the flash illumination.

DETAILED DESCRIPTION

Figure 1:
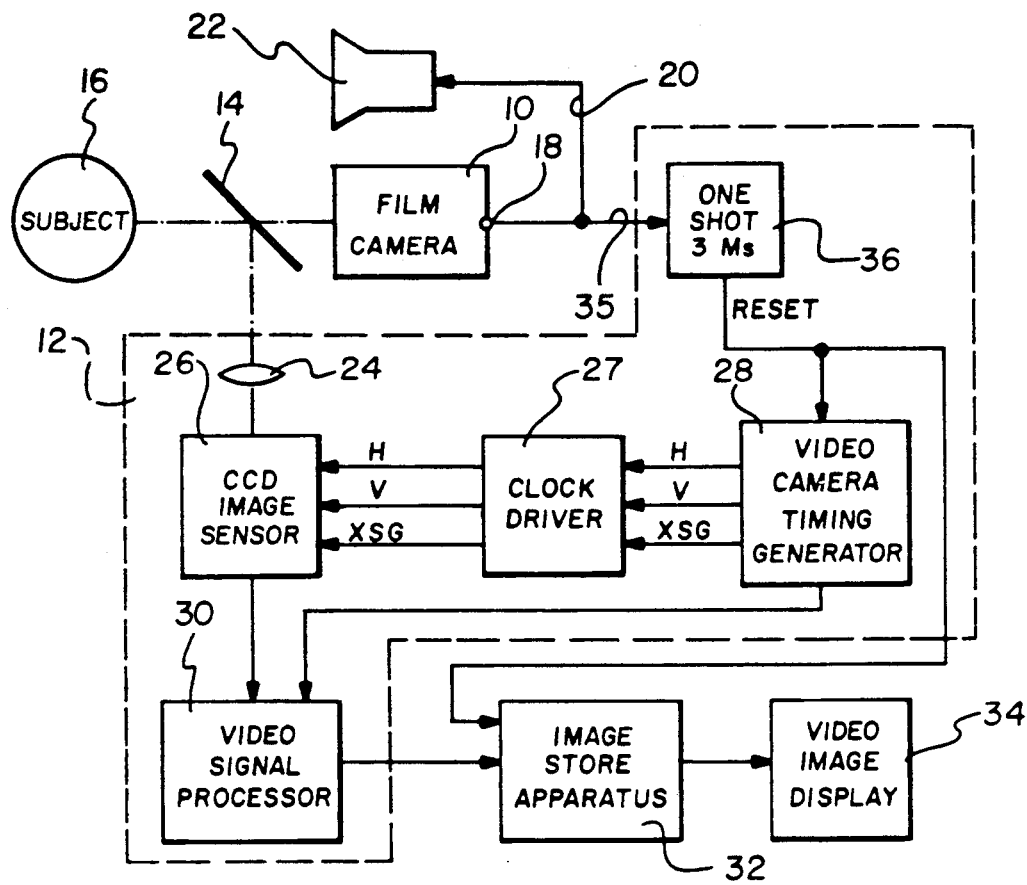
FIG. 1 is a block diagram of one preferred embodiment of an image recording system constructed in accordance with the present invention.

Referring to FIG. 1, the illustrated image recording system includes a photographic film camera 10 and a video camera 12. A beamsplitter 14 is situated to direct light reflected from a subject 16 simultaneously to film camera 10 and video camera 12. Alternatively, beamsplitter 14 may be omitted and cameras 10 and 12 aimed directly at the subject 16. Film camera 10 is conventionally provided with a "PC" output terminal 18 for supplying a flash request electrical signal which is asserted when the film gate in the camera is completely opened and is deasserted when the film gate begins to close. The flash request signal from terminal 18 is conventionally applied via line 20 to flash apparatus 22 to initiate flash illumination on subject 16.

The video camera 12 includes an imaging lens 24 which focuses an image of subject 16 onto a solid state CCD imaging sensor 26 for capturing the video image of the subject 16. A video camera timing generator 28 includes conventional image transfer clocking means adapted to provide, in known manner, image transfer processing signals V, H and XSG via a clock driver circuit 27 to sensor 26 to control the timing at which sequential lines of image pixel data are transferred out of sensor 26 to video signal processing circuits 30. The details of this operation are well known in the art with the process of transferring image data out of sensor 26 being described in the above mentioned U.S. Pat. No. 4,805,037, the disclosure of which is incorporated herein by reference.

Timing generator 28 also provides timing signals to video signal processor 30 which operates in known manner to generate a composite video signal comprised of successive fields of video image signals derived from the image pixel data from sensor 26 and separated by vertical blanking intervals. The composite video signal output from the video processor 30 is furnished to image store apparatus 32 to store the video image signal, for example on still video floppy disks, for subsequent display on a video display monitor 34. As is well known, and depending on the nature of the video processing circuits employed, the video image signal may be stored as a non-interlaced image frame or, more typically, for NTSC type video signals, as a full frame of two successive interlaced image fields. In the latter case, either a single field of video information may be displayed with some loss of vertical resolution or, more preferably, a full frame of two successive interlaced fields is displayed for full resolution.

In accordance with a particular feature of the invention, the flash request signal from output terminal 18 of film camera 10 is also coupled to a one shot multivibrator circuit 36 in video camera 12 to generate a reset signal which is applied to clock generator circuit 28 and also to image store apparatus 32. One shot circuit 36 comprises reset means responsive to the flash request signal for interrupting operation of the clock generator circuit 28 at the beginning of a flash illumination by flash apparatus 22 and further serves according to the invention to restart the clock generator circuit 34 following conclusion of the flash illumination to initiate the transfer of image information from the image sensor 26 to the video processing circuits 30. The restarting of the image transfer process at the conclusion of the reset period is adapted so that regardless of when the image transfer process was interrupted at the beginning of reset, as a consequence of a randomly generated PC flash request, the process of image transfer out of image sensor 26 starts anew at the beginning of an image field. In this fashion, the flash illumination is assured of being evenly distributed across a full frame of video image signal, either two successive fields of interlace video or a single frame of non-interlace video.

Figure 2:
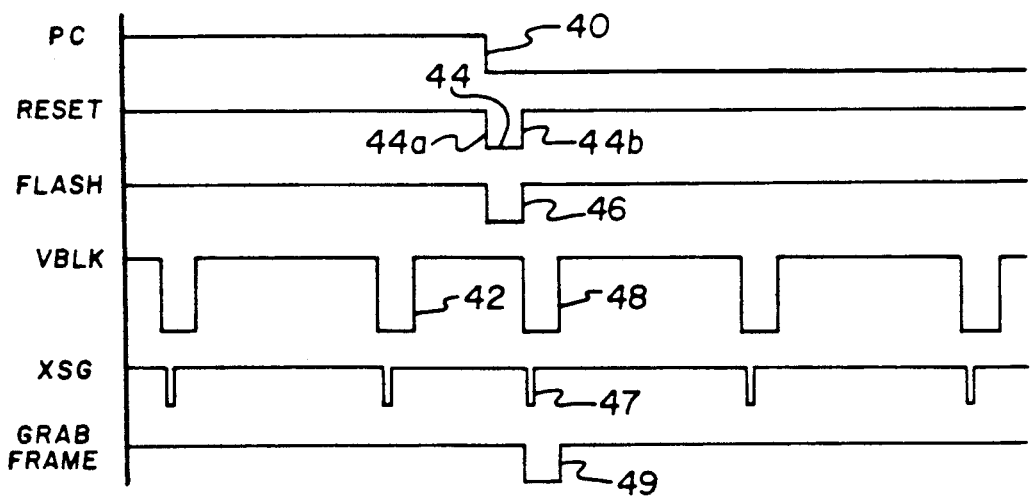
FIG. 2 is a timing diagram of signal conditions for the system of FIG. 1.

This is best illustrated in the timing diagram of FIG. 2 wherein a PC flash request signal 40 is asserted at an arbitrary time following the occurrence of a vertical blanking pulse 42 generated in timing generator 28. The assertion of PC signal 40 causes one shot circuit 36 to generate a reset signal 44 of a predetermined duration preferably chosen to be at least equal to the maximum duration of the flash illumination by flash apparatus 22. In the system of FIG. 1, a reset duration of 3 ms is chosen as being adequate for most professional studio strobe flash units, although other durations might also be preferred. When reset signal 44 is asserted, i.e. goes low at falling edge 44a, the operation of timing generator 28 is interrupted which, in turn, interrupts the image transfer process at image sensor 26 by momentarily disabling the clocking signals applied via clock driver 27. The video timing signals applied to video process 30 are also momentarily disabled. At the conclusion of the flash illumination, as represented by the rising edge of pulse 46, the reset signal 44 desserts, i.e. goes high at 44b, thus enabling timing generator 28 to reinitiate generation of the image transfer and video signal timing signals as represented by XSG signal 47 and vertical blanking signal 48. Coincident with this, image store apparatus is set to respond to the reset signal 44 supplied on line 49 represented by "grab frame" signal 49 to initiate storage of the ensuing frame of video image signal from processor 30.

It will be appreciated from FIG. 2 that interrupting the process of image transfer out of sensor 26 any time a flash is initiated and restarting with the beginning of an image field assures that the flash illumination will be properly and fully present on the image stored in apparatus 32. In the case of full frame storage (non-interlaced fields), the full flash illumination will be captured and stored. In the case of NTSC type video signals with interlaced fields, the flash will be evenly distributed across two successive video image fields stored in apparatus 32. One difficulty with the system of FIG. 1, however, is that the resetting of video synchronization, as represented by the truncated interval between vertical blanking signals 42 and 48, will result in a momentary loss of synchronization of the video image on display 34. This is not thought to be serious problem, however, since the monitor is able to resynchronize on the new video timing in a matter of only one or two seconds.

Figure 3:
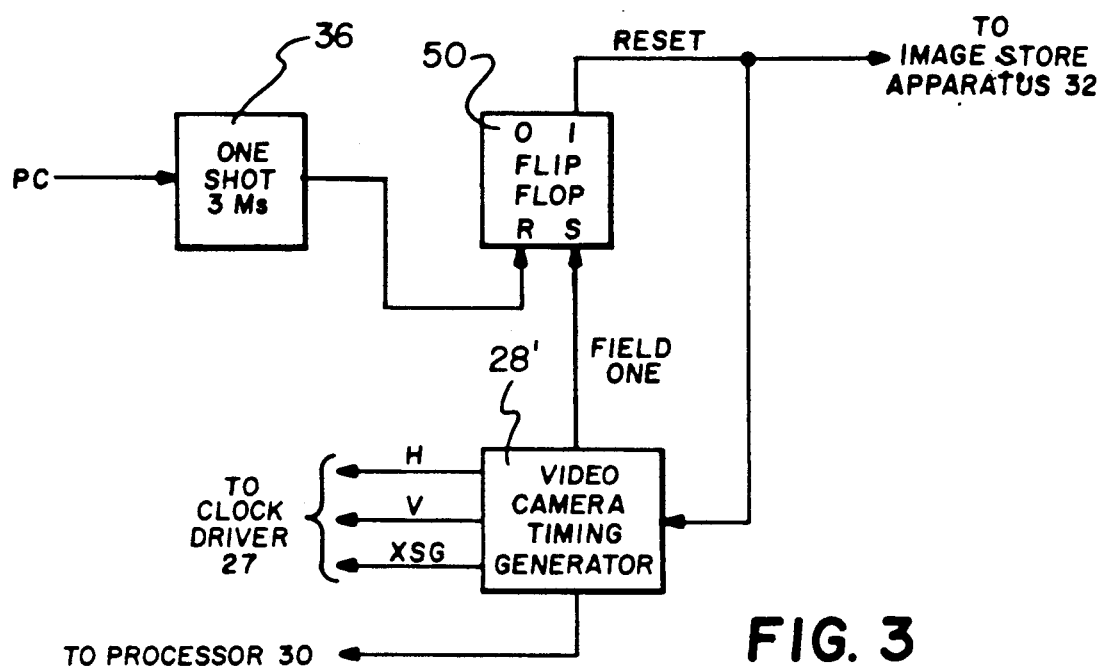
FIG. 3 is a block diagram of a portion of the system of FIG. 1 illustrating another preferred embodiment of the present invention.
Figure 4:
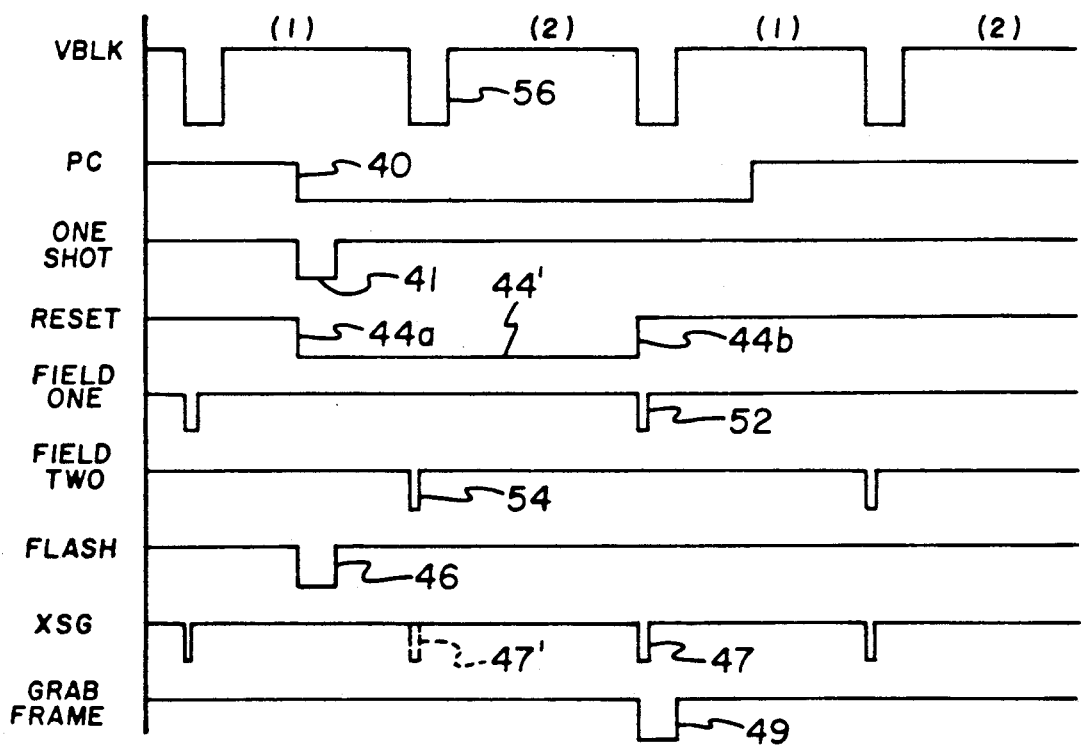
FIG. 4 is a timing diagram signal of conditions for a signal recording system of FIG. 1 when modified as shown by the block diagram of FIG. 3.

In FIG. 3, a modification of the reset means is shown which obviates the problem of synchronization loss. In the modification of FIG. 3, the output of the one shot 36, rather than being applied directly to video timing generator 28', is coupled to one input terminal of a bistable flip-flop circuit 50. A field timing pulse, preferably the "field one" pulse, from timing generator 28 is applied to the other input terminal of flip-flop 50. The set output side of flip-flop 50 corresponding to the "field one" input is then used as the reset signal applied to the video timing generator 28' and image store apparatus 32. The operation of timing generator 28' in response to the reset signal from flip-flop 50 is similar to that of generator 28 in FIG. 1 except that only the image transfer clocking signals are interrupted by the reset signal in the system of FIG. 3. The video timing signals sent to video processor 30 are not affected. The effect of this can be seen with reference to the timing diagram of FIG. 4. Thus the random arrival of a PC flash request signal 40 generates an intermediate one shot pulse 41 applied to the R input terminal of flip-flop 50 causing the "1" output side to fall at 44a of the modified reset signal 44'. A flash illumination is simultaneously generated as represented by pulse 46. As long as the reset signal 44' is low, the image transfer process at sensor 26 is interrupted or suppressed as represented by the absence of an XSG pulse 47' shown in dotted outline below vertical blanking signal 56. Unlike the reset signal 44 of FIG. 2 which lasts for onlY the fixed 3 ms duration established by one shot circuit 36, the modified reset signal 44' of FIG. 4 is extended until the occurrence of the next "field one" pulse from timing generator 28'. The "field one" pulse is applied to the S terminal of flip 50 to set the "1" output side of flip-flop 50 high at 44b thus enabling XSG pulse 47 to reinitiate the image transfer process at the beginning of an image field and generating a Grab Frame pulse to initiate image storage in apparatus 32. As a consequence of this arrangement, the timing of vertical blanking (and other video timing signals) is uninterrupted and there is no disruption of the video sync at the display monitor. It will be appreciated that either field pulse may be used to terminate the reset signal 44' and that the frame pulse in a full frame, non-interlace video system may also be used. As used in the appended claims, the term field timing pulse is intended to refer either to an interlace field timing pulse or to a frame timing pulse of a non-interlace video system.

The invention has been described in detail with particular reference to a presently preferred embodiment, but it will be understood that variations and modifications can be effected within the spirit and scope of the invention.

What is claimed is:

1. An image recording system for simultaneously recording images of a subject in electronic and photosensitive media, comprising:
    a photographic camera for recording a photographic image of said subject on said photosensitive medium, said photographic camera including means for supplying a flash request signal;
    a video camera including a solid state image sensor for capturing an image of said subject on said image sensor, said video camera including video signal processing circuits for converting image information from said image sensor into a video signal and a video timing generator including image transfer clocking means for controlling transfer of the image information from said image sensor to said video processing circuits;
    flash means responsive to said flash request signal for flash illuminating said subject to allow simultaneous image capture by said photographic and video cameras; and
    reset means responsive to said flash request signal for interrupting operation of said clocking means at the beginning of a flash illumination and for restarting the clocking means following conclusion of the flash illumination to initiate, at the beginning of an image field, the transfer of image information from the imaging device to the video signal processing circuits.

2. An image recording system according to claim 1 in which said flash illumination has a time duration of a predetermined maximum duration and said reset means interrupts said image transfer for at least said predetermined maximum duration.

3. An image recording system according to claim 1 further including image storage means for storing the video image signal from said video camera and means responsive to said reset means to initiate storage of said video image signal following resetting of the clocking means.

4. An image recording system according to claim 1 in which the timing generator further includes means for supplying video timing signals to the video processing circuits and the reset means is adapted to interrupt and restart the video timing signals simultaneous with the image transfer clocking means to maintain synchronism between the two.

5. An image recording system according to claim 1 in which the reset means further includes means responsive to a field timing signal from the video timing generator to synchronize restarting of the image transfer clocking means with the beginning of a desired field interval following conclusion of the flash illumination.

6. An image recording system according to claim 1 in which the reset means further includes means responsive to a field timing signal from the video timing generator for delaying restarting of the image transfer clocking means until the start of a subsequendt field interval following conclusion of the flash illumination, there being no interruption in the timing of the video signal processing circuits.

7. A method of recording an image substantially simultaneously on electronic and photosensitive mediums with a single flash illumination comprising the steps of:
    initiating the capture of a photographic image of said subject on a photosensitive medium;
    initiating the capture of an image of said subject on image sensor means of a video camera;
    periodically transferring image information from the image sensor to video processing circuits to convert the image information into video signal format;
    generating a flash request signal for the purpose of initiating a flash illumination of said subject during the capture of said photographic and video images;
    in response to the flash request signal, interrupting the image transfer from the image sensor to the video signal processing circuits and resetting the image transfer to commence at the beginning of a video field following conclusion of the flash illumination.

8. The method of claim 7 further including the step of initiating storage of at least one full field of the video image from the video camera following the resetting of the image transfer in the video camera.

9. The method of claim 7 including the step of interrupting both image transfer processing and video timing and restarting both simultaneously.

10. The method of claim 7 including the step of delaying restart of the image transfer process to coincide with a predetermined video image field following conclusion of flash illumination without interrupting video timing signals.

* * * * *